(12) United States Patent
Riley et al.

(10) Patent No.: US 9,354,036 B2
(45) Date of Patent: May 31, 2016

(54) SYSTEM AND METHOD FOR DEVELOPING FAULT DIAGNOSTICS AND FAILURE PROGNOSIS OF SPLINE WEAR IN A DRIVE SYSTEM

(75) Inventors: Walter Riley, Richardson, TX (US); Keith Hale, Joshua, TX (US); Charles Eric Covington, Colleyville, TX (US)

(73) Assignee: Textron Innovations Inc., Providence, RI (US)

( * ) Notice: Subject to any disclaimer, the term of this patent is extended or adjusted under 35 U.S.C. 154(b) by 623 days.

(21) Appl. No.: 13/576,127

(22) PCT Filed: Mar. 18, 2011

(86) PCT No.: PCT/US2011/028928
§ 371 (c)(1),
(2), (4) Date: Jul. 30, 2012

(87) PCT Pub. No.: WO2011/119419
PCT Pub. Date: Sep. 29, 2011

(65) Prior Publication Data
US 2012/0303294 A1 Nov. 29, 2012

Related U.S. Application Data

(60) Provisional application No. 61/316,106, filed on Mar. 22, 2010.

(51) Int. Cl.
*G01B 21/06* (2006.01)
*G06F 19/00* (2011.01)
(Continued)

(52) U.S. Cl.
CPC ............... *G01B 7/146* (2013.01); *G01B 21/16* (2013.01); *G01M 13/021* (2013.01)

(58) Field of Classification Search
CPC ...... G01B 21/16; G01B 5/0002; G01B 7/146; G01M 13/021; B21B 1/08; B21B 31/00; B21B 31/07; B21B 31/16; B21B 31/18
USPC .............. 702/34, 35, 181; 72/88, 247; 73/162
See application file for complete search history.

(56) References Cited

U.S. PATENT DOCUMENTS 4,350,041 A 9/1982 Loker et al.
4,589,269 A * 5/1986 Michaux .......................... 72/247
(Continued)

FOREIGN PATENT DOCUMENTS

EP 2496076 A1 9/2012

OTHER PUBLICATIONS

European Search Report dated Feb. 6, 2013 from counterpart EP App. No. 11759946.4.
(Continued)

*Primary Examiner* — John H Le
(74) *Attorney, Agent, or Firm* — James E. Walton

(57) ABSTRACT

A diagnosis system and method to detect wear between a first set of teeth of a first gear and a second set of teeth of a second intermeshing gear, the diagnosis system having a first target associated with the first set of teeth, a second target associated with the second set of teeth, a first sensor adapted to detect the location of the first target, a second sensor adapted to detect the location of the second target, and a processing system in data communication with the first sensor and the second sensor, the processing system being adapted to process a spatial relationship between the first target relative to the second target after a time lapse of rotation between the first set of teeth and the second set of teeth.

18 Claims, 6 Drawing Sheets

(51) Int. Cl.
  *G01B 7/14* (2006.01)
  *G01B 21/16* (2006.01)
  *G01M 13/02* (2006.01)

(56) References Cited

U.S. PATENT DOCUMENTS

| | | | |
|---|---|---|---|
| 4,931,949 | A | 6/1990 | Hernandez et al. |
| 5,265,467 | A | 11/1993 | Baer |
| 6,507,789 | B1 | 1/2003 | Reddy et al. |
| 2003/0074159 | A1 | 4/2003 | Bechhoefer et al. |
| 2005/0177321 | A1 | 8/2005 | Wang et al. |
| 2009/0139478 | A1 | 6/2009 | Dell et al. |
| 2010/0162808 | A1 | 7/2010 | Wong et al. |
| 2011/0017013 | A1 | 1/2011 | Bader |

OTHER PUBLICATIONS

International Search Report and the Written Opinion of the International Searching Authority mailed by ISA/USA, U.S. Patent and Trademark Office on May 19, 2011 for International Patent Application No. PCT/US11/28928, 6 pages.

Canadian Office Action dated Jan. 6, 2014 from counterpart CA App. No. 2,793,858.

Office Action dated Nov. 17, 2014 from counterpart EP App. No. 11759946.4.

\* cited by examiner

SYSTEM AND METHOD FOR DEVELOPING FAULT DIAGNOSTICS AND FAILURE PROGNOSIS OF SPLINE WEAR IN A DRIVE SYSTEM

TECHNICAL FIELD

The present application relates generally to diagnosis systems, and more particularly, diagnosis systems for determining wear between two intermeshing parts.

DESCRIPTION OF THE PRIOR ART

Spline systems comprise a male component adapted to fit snugly within a female component. One of the components includes one or more ridges, i.e., teeth or keys, adapted to mesh with grooves in the mating component. Splines are typically utilized in drive systems, wherein the spline transfers torque from one independent member to another independent member or other members.

The intermeshing portions of the spline system are prone to wear and eventually fail over time due to engine torque exerted thereto, thus requiring periodic maintenance inspections. In some scenarios the diagnosis requires disassembling the drive system to inspect the spline wear, which in turn can result in significant aircraft downtime and associated costs.

Although the foregoing diagnosis does allow inspection of spline wear, considerable shortcomings remain.

BRIEF DESCRIPTION OF THE DRAWINGS

The novel features believed characteristic of the application are set forth in the appended claims. However, the application itself, as well as a preferred mode of use, and further objectives and advantages thereof, will best be understood with reference to the following detailed description when read in conjunction with the accompanying drawings, wherein:

Figure 1A:
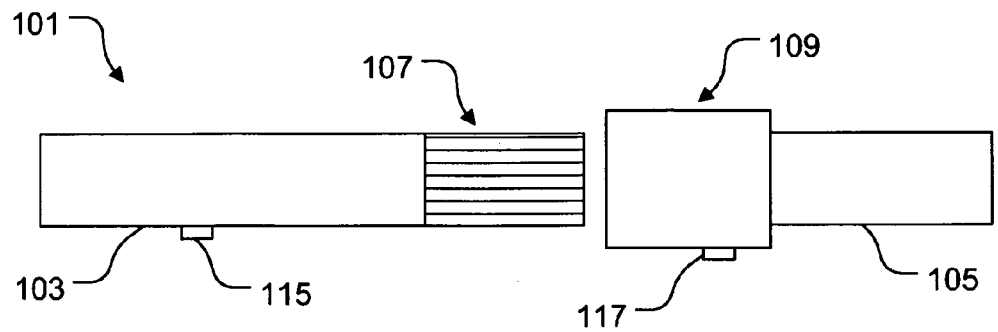
FIGS. 1A and 1B are front views of a diagnosis system according to the preferred embodiment.

While the system and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DESCRIPTION OF THE PREFERRED EMBODIMENT

The system and method of the present application overcomes the disadvantages associated with conventional methods of periodically inspecting spline wear. Illustrative embodiments are described below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present application is directed to a system and method for inspecting wear on meshing components of a spline. The system and method reduces, if not eliminates, aircraft downtime and maintenance costs associated with the inspection process. In particular, the diagnosis system utilizes sensors, which provides real time inspection of wear between the two intermeshing components of the spline system during operation. The diagnosis system provides real time determination whether wear exists without having to disassemble the drive system, which in turn reduces aircraft downtime and associated costs.

In the preferred embodiment, the diagnosis system is utilized with spline systems. However, it should be appreciated that the diagnosis system is easily adapted for use with other systems. For example, the diagnosis system could easily be adapted for use with a gear system having two or more intermeshing gears, wherein the gear teeth are prone to wear over time.

Figure 1B:
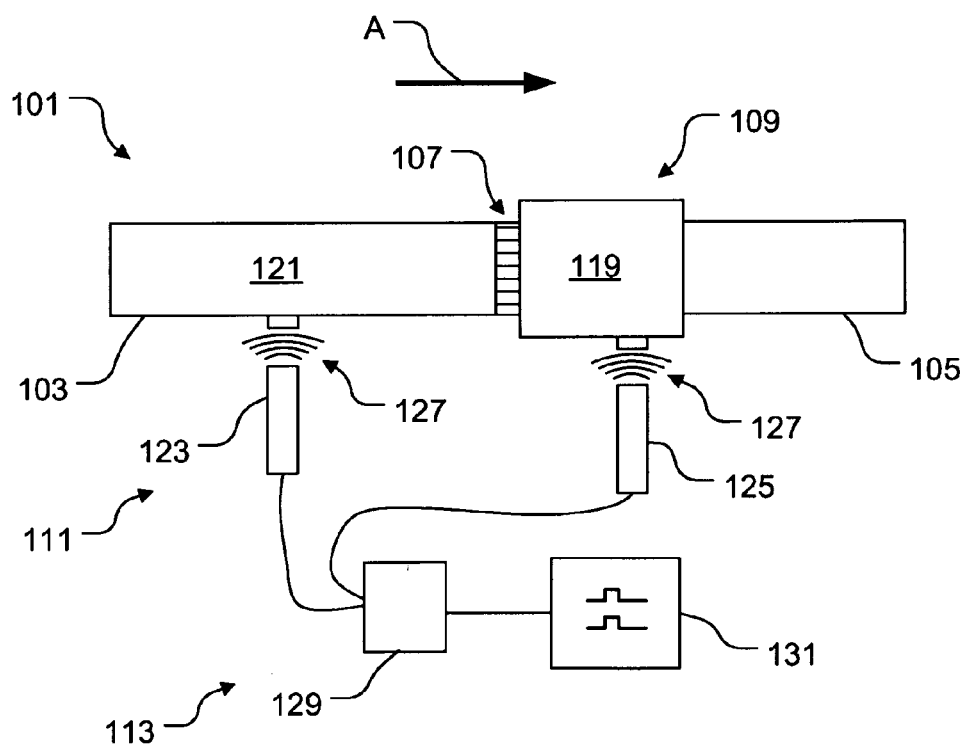

Referring now to FIGS. 1A and 1B in the drawings, front views of diagnosis system 101 are shown according to the preferred embodiment of the present application. System 101 comprises one or more of a first member 103 adapted to couple to a second member 105. First member 103 includes a male attachment portion 107 adapted to fit within a female attachment portion 109. In the preferred embodiment, male attachment portion 107 fits within female attachment portion 109; however, alternative embodiments could include attachment portions that do not fit within each other, i.e., two parallel members each having a set of teeth adapted to intermesh with each other.

FIG. 1A shows first member 103 separated apart from second member 105, while FIG. 1B shows first member 103 moved in direction A such that male portion 107 of first member 103 engages with female portion 109 of second member 105. Female attachment portion 109 is preferably a hollow cavity having one or more recessed surfaces for receiving one or more surfaces of male attachment portion 107 (see FIG. 4). In the preferred embodiment, female attachment portion 109 includes a set of recessed teeth operably associated with a set of teeth from male attachment portion 107. However, it will be appreciated that alternative embodiments could utilize other means for attaching first member 103 to second member 105. For example, a key and a key slot could be used in lieu of the preferred embodiment.

System 101 further comprises a detection subsystem 111 for detecting, conditioning, and processing the spatial relationship of first member 103 relative to second member 105 during operation. Detection subsystem 111 is operably associated with a display subsystem 113, which provides displaying means of the process data from detection subsystem 111.

Detection subsystem 111 comprises one or more of a first target 115 carried by first member 103 and a second target 117 carried by second member 105. In the exemplary embodiment, second target 117 is attached to an outer surface 119 of female portion 109, while first target 115 is attached to an outer surface 121 of first member 103. It should be appreciated that second target 117 could be positioned on any surface of second member 105 in lieu of the exemplary location. Also, in the exemplary embodiment, target 115 and target 117 protrude from respective surface 121 and surface 119. However, it should be appreciated that alternative embodiments could include different targets without departing from the spirit of the present application. For example, alternative embodiments could include reflective targets or machined surface treatments, i.e., a notch, gear tooth, spline tooth, pin, and/or other suitable surface treatments or other targets for providing relative rotational motion between first member 103 to second member 105.

Detection subsystem 111 further comprises a first sensor 123 for detecting the presence of first target 115 and likewise, a second sensor 125 for detecting the presence of second target 117. In the preferred embodiment, both sensor 123 and sensor 125 are adapted to induce a magnetic field 127, which in turn is disturbed by the motion of target 115 and target 117, respectively. Thereafter, display subsystem 113 conditions the signals from sensor 123 and sensor 125, calculates the time difference between signal detection, and relays the data to one or more display means. This process enables a user to determine rotational movement of first member 103 relative to second member 105.

Sensor 123 and sensor 125 are preferably sensors adapted to create and detect rotation of non-uniform ferrous rotating members. In the preferred embodiment, sensor 123 and sensor 125 are monopole sensors. However, it should be appreciated that alternative embodiments could include other suitable sensors comprising different means for detecting the presence of the corresponding targets. For example, alternative embodiments could include an azimuth, laser, optical interrupter adapted to emit a beam of light, and/or other suitable sensors in lieu of preferred embodiment.

Display subsystem 113 is utilized to collect processed data from detection subsystem 111 and display the processed data one or more displaying means. Display subsystem 113 comprises one or more of a processing system 129 and a display 131. Processing system 129 is operably associated with sensor 123 and sensor 125, wherein sensed data from the sensors are collected, conditioned, and processed by processing system 129, which in turn relays the processed data in readable form to display 131. Processing system 129 comprises the necessary hardware and software to convert raw data from detection subsystem 111 to display on display 131, thereby allowing a user to quickly and effectively determine if wear between first member 103 and second member 105 exists.

Figure 2A:
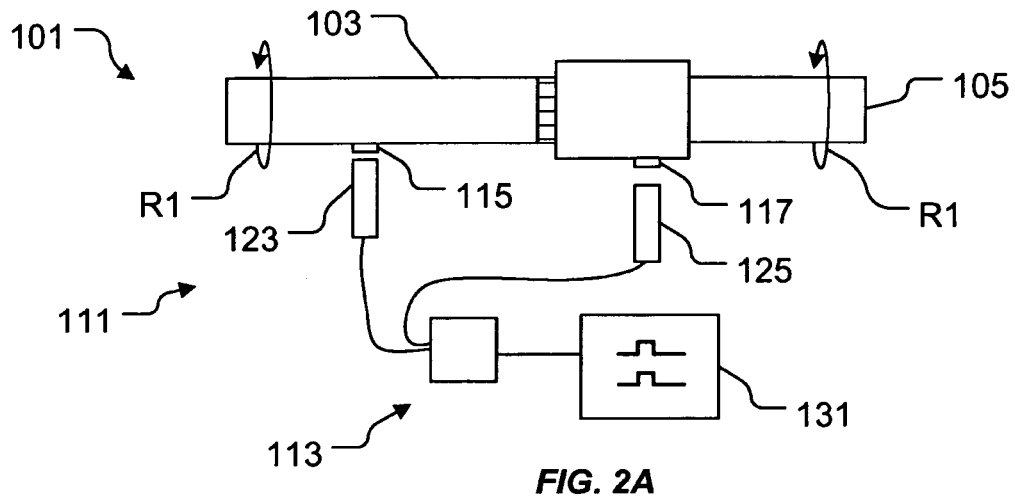
FIGS. 2A-2C are front views of the diagnosis system of FIG. 1 shown during the initial start of operation.
Figure 2B:
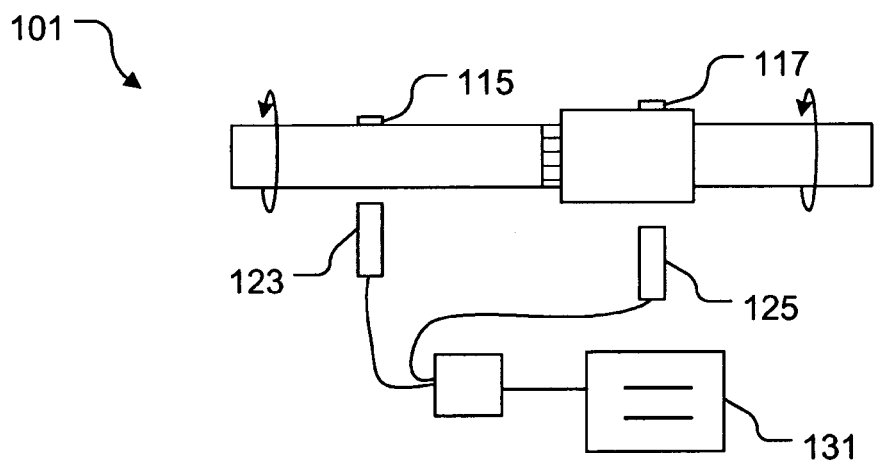
Figure 2C:
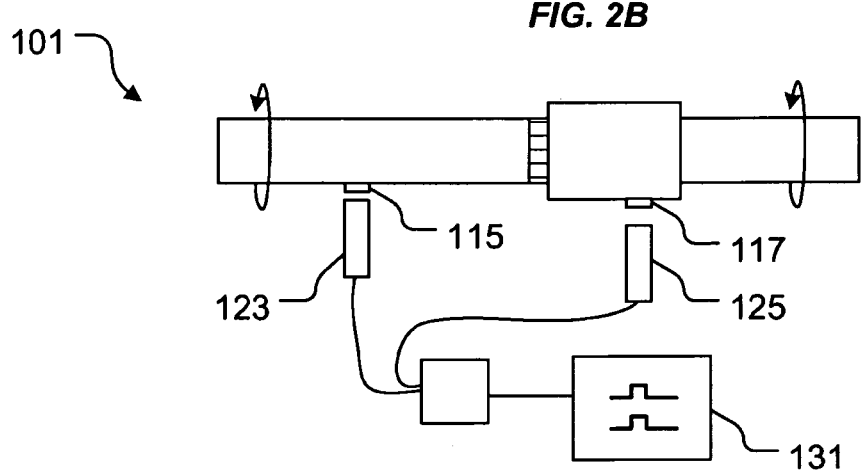

Referring to FIGS. 2A-2C in the drawings, front views of diagnosis system 101 are shown during the initial start of operation. During operation, both first member 103 and second member 105 rotate at a same rotational R1 relative to each other. As the members rotate, detection subsystem 111 detects the rotational movement of first member 103 relative to second member 105, which in turn is displayed on display 131. FIGS. 2A and 2C show detection of both target 115 and target 117 on display 131, and FIG. 2B shows no detection of target 115 and target 117 on display 131.

Figure 3A:
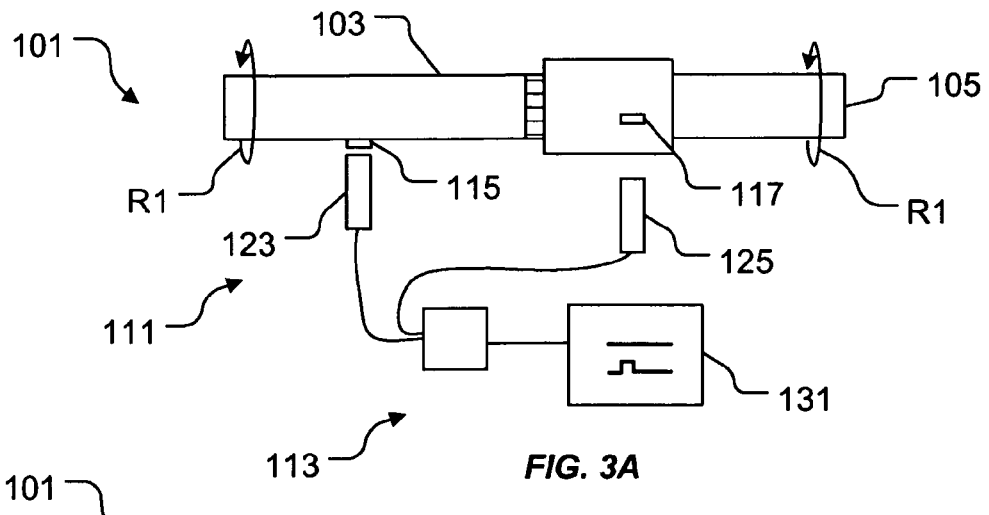
FIGS. 3A-3C are front views of the diagnosis system of FIG. 1 shown during a time lapse from the initial start of operation.
Figure 3B:
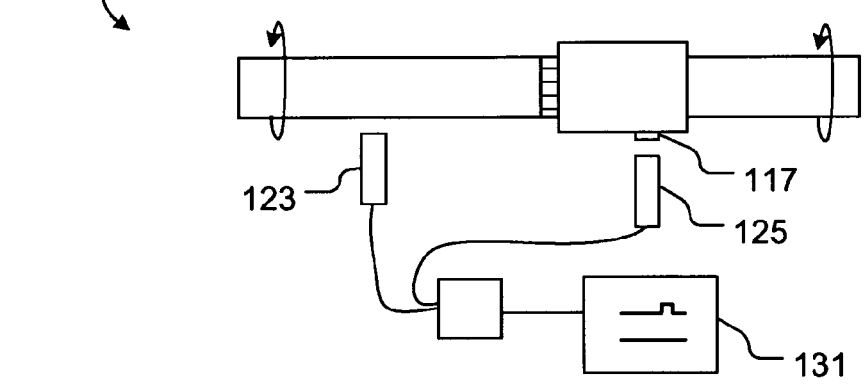
Figure 3C:
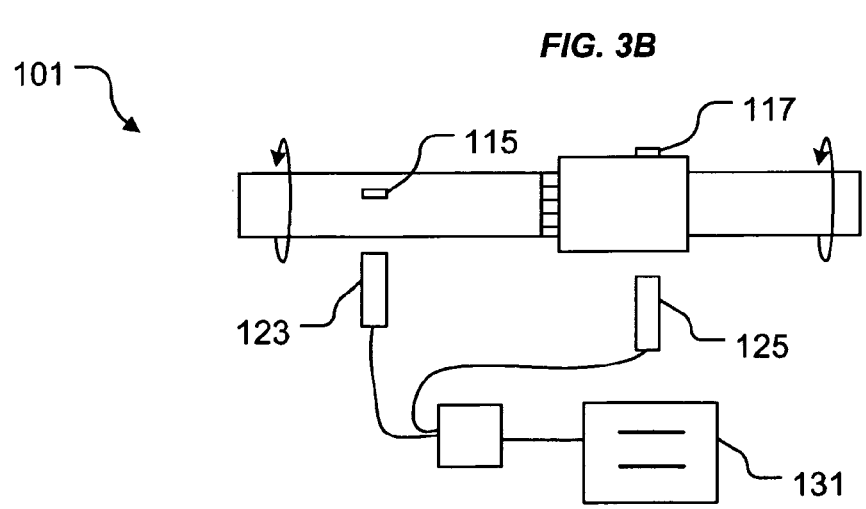

FIGS. 3A-3C show front views of diagnosis system 101 after a time lapse rotation from the initial start of operation. During operation, wear is created between the intermeshing components of male attachment portion 107 and female attachment portion 109, which in turn creates a spatial relationship, i.e., change in circumferential distance, between target 115 and target 117. For example, FIG. 3A shows a circumferential difference between the targets as wear occurs between the intermeshing components. In FIG. 3A, system 101 detects the presence of target 115, while not detecting the presence of target 117, as shown on display 131 (compare FIG. 2A with 3A). FIG. 3B shows detection of target 117, while FIG. 3C shows no detection of either target of member 103 and member 105, as shown on display 131.

Figure 4A:
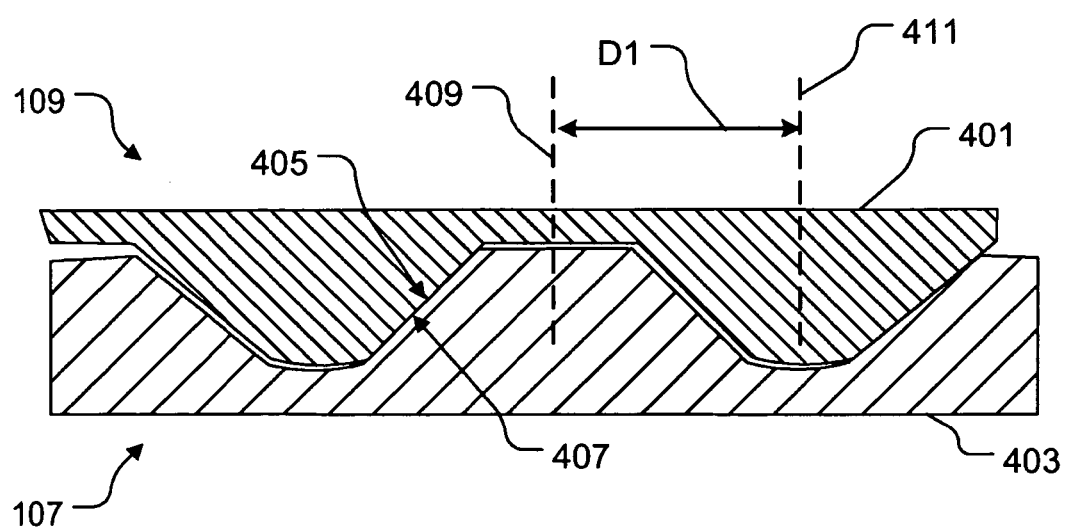
FIGS. 4A and 4B are cross-sectional views of meshing teeth of a spline and a mating engine component before and after the time lapse from the initial start of operation.
Figure 4B:
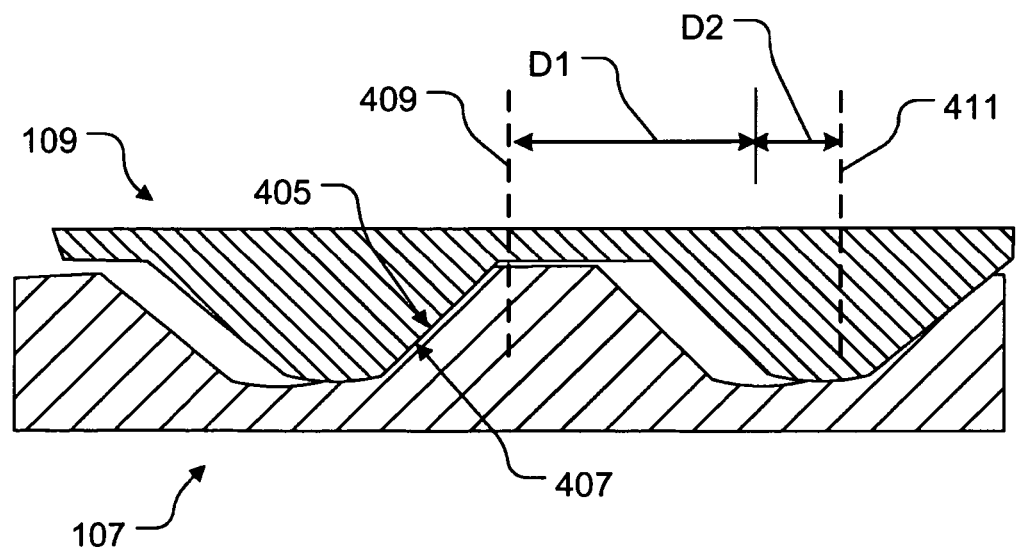

Referring to FIGS. 4A and 4B in the drawings, cross-sectional side views of a portion of intermeshing teeth from male attachment portion 107 and female attachment portion 109 are shown before and after a time lapse of operation. FIG. 4A shows female attachment portion 109 of second member 105 having a first set of teeth 401 adapted to intermesh with a second set of teeth 403 from male attachment portion 107 of first member 103. First set of teeth 401 includes a contact surface area 405, which comes into contact with a contact surface area 407 of second set of teeth 403.

FIG. 4A shows the set of teeth at the initial start of operation, where wear between the intermeshing teeth has not yet occurred. A distance D1 of the first set of teeth 403 relative to the second set of teeth 401 is defined by a dashed line 409 and a dashed line 411. During operation, the rotational torque between member 103 and member 105 causes wear on surface 405 and/or surface 407, thereby increasing the distance D1.

FIG. 4B depicts the first and second set of teeth after a time lapse rotation from the initial start of operation, where wear between the intermeshing teeth has occurred, resulting in an increased distance D2 between the intermeshing teeth. The increased distance between set of teeth 401 and set of teeth 403 creates a circumferential distance of target 115 relative to target 117, as shown in FIG. 3A. The increased circumferential distance is detected by detection subsystem 111 and displayed on display 131.

Figure 5:
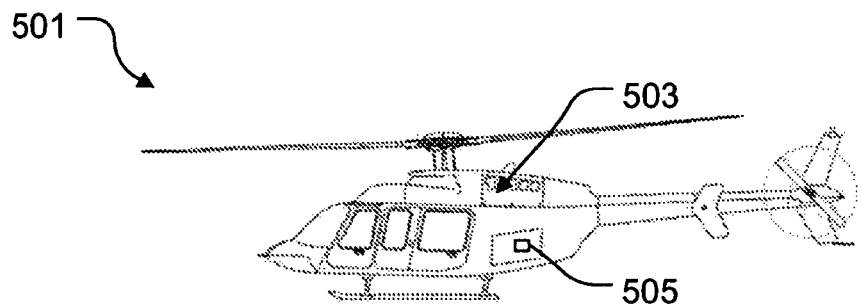
FIG. 5 is an aircraft utilizing the diagnosis system of FIG. 1.

Referring to FIG. 5 in the drawings, a side view of an aircraft 501 utilizing diagnosis system 101 is shown. In the preferred embodiment, system 101 can be used in one or more different drive systems of an aircraft. Also, in the exemplary embodiment, aircraft 501 is a helicopter; however, it should be appreciated that system 101 could easily be utilized with drive systems operably associated with different types of vehicles and/or machinery. For example, system 101 could easily be adapted for use with a land-based machine, i.e., a turbine having intermeshing gears rotating at the same or different RPM with respect to each other.

Figure 6:
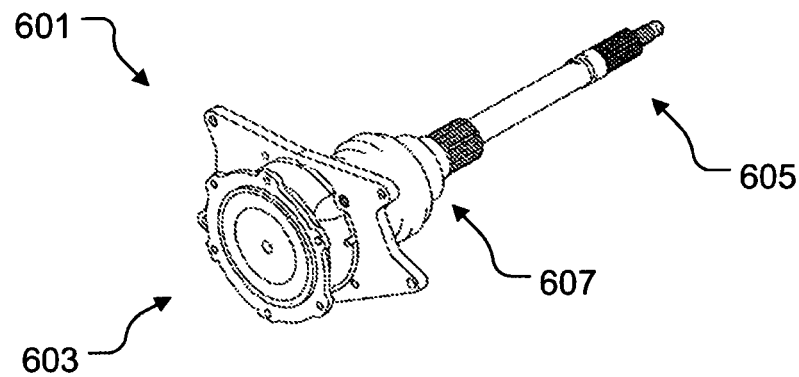
FIG. 6 is a spline of the aircraft of FIG. 5.
Figure 7:
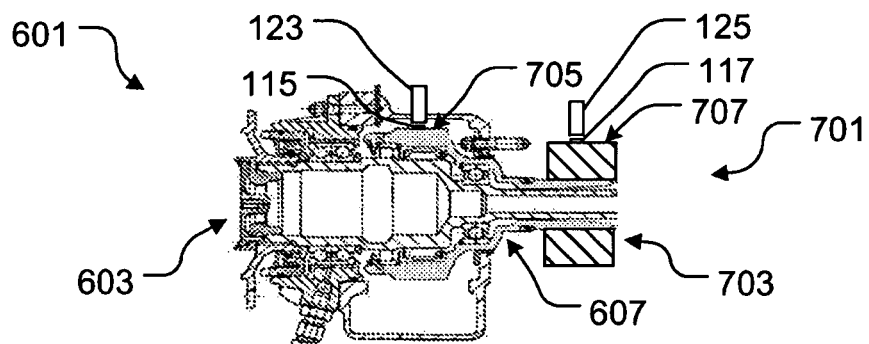
FIG. 7 is a cross-sectional view of the spline of FIG. 5 partially disposed within a drive system.

Aircraft 501 comprises one or more of a compartment 503 for housing both the aircraft engine and a spline adapter (see FIG. 6). Aircraft 501 is further provided with an optional port 505 conductively coupled to system 101 for relaying processed data to one or more of an external system and/or display:

FIG. 6 shows an oblique view of spline adapter 601 taken from compartment 503 of aircraft 501. Spline adapter 601 comprises a section 603 adapted to couple with a main rotor system (not shown) and a section 605 adapted to couple with a tail rotor system (not shown). Spline adapter 601 is further provided with a spline 607, which couples to a drive assembly. FIG. 7 shows a cross-sectional view of spline adapter 601 attached to a drive system 701. Drive system 701 comprises one or more of an attachment portion 703 for coupling with spline 607. In the preferred embodiment, sensor 123 is selectively positioned to detect the presence of target 115 on a surface 705 of spline member 607, while sensor 125 is selectively positioned to sense target 117 on a surface 707 of attachment portion 703.

Figure 8:
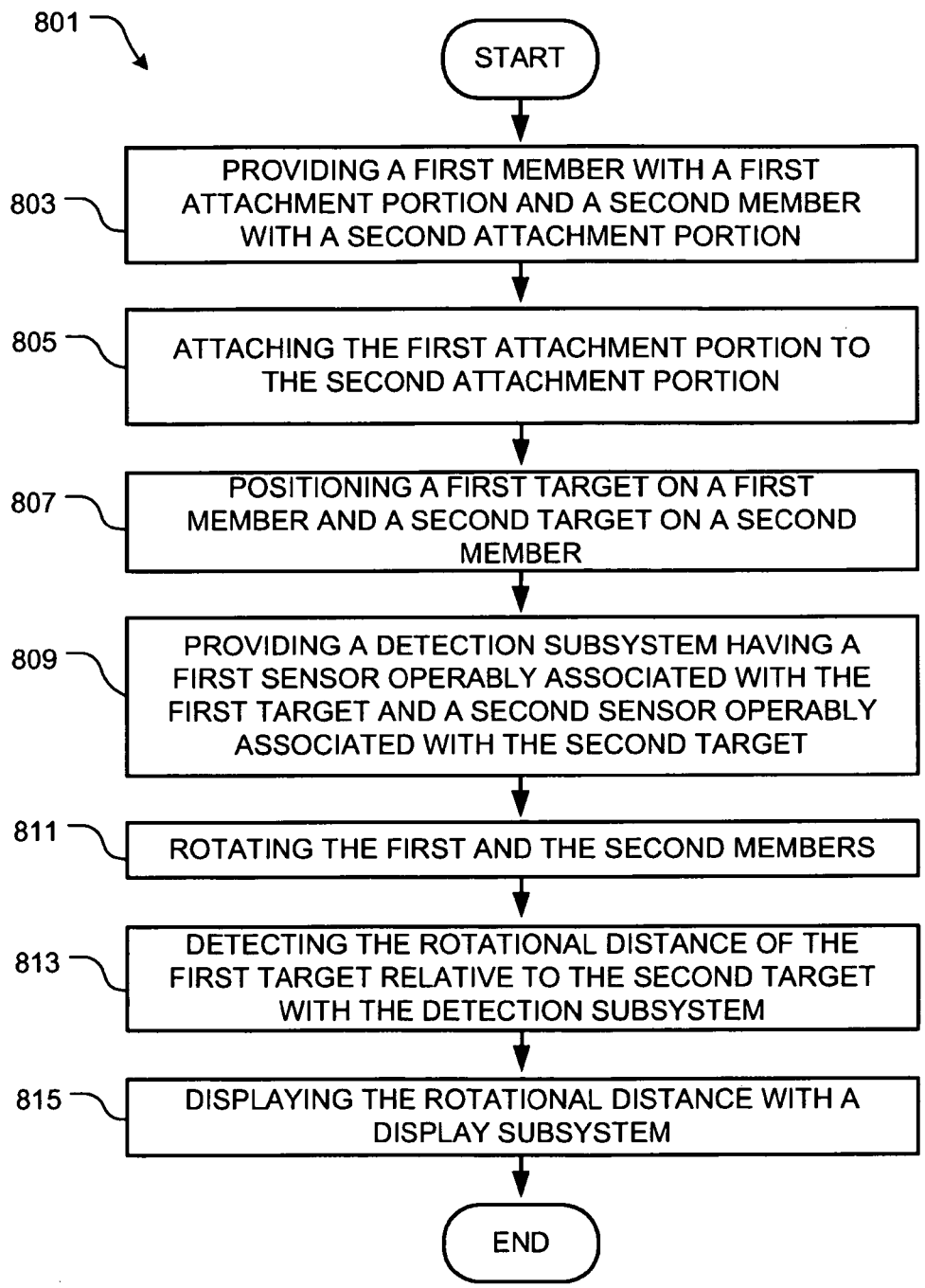
FIG. 8 is a flow chart illustrating the method of diagnosis according to preferred embodiment.

Referring to FIG. 8 in the drawings, a flow chart 801 illustrating the preferred method of the present application is shown. Box 803 depicts the first step, which includes providing a first member 103 and a second member 105, each member having an attachment portion associated thereto. The attachment members are thereafter attached, as indicated in box 805. The next step includes positioning first target 115 on first member 103 and second target 117 on second member 105, as depicted in box 807. Detection subsystem 111 includes first sensor 123 operably associated with target 115 and second sensor 125 operably associated with target 117, as depicted in box 809. Thereafter, detection subsystem 111 and display subsystem 113 are utilized to detect and display the rotational distance of the first and second target, as depicted in boxes 811, 813, and 815.

It is apparent that a diagnosis system and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

The invention claimed is:

1. A diagnosis system adapted to determine teeth wear between a first set of teeth of a first gear and a second set of teeth of a second intermeshing gear, the diagnosis system comprising:
a first target positioned on the first gear;
a second target positioned on the first gear;
a first sensor configured to detect a first rotational position of the first target as the first gear rotates;
a second sensor configured to detect a second rotational position of the second target as the second gear rotates; and
a processing system in data communication with the first sensor and the second sensor, the processing system being configured to process a rotational spatial relationship between the first rotational position and the second rotational position;
wherein the first set of teeth intermesh with the second set of teeth; and wherein after a time lapse of rotation between the first set of teeth and the second set of teeth, the spatial relationship between the first target and the second target changes, thus indicating wear between the first set of teeth and the second set of teeth.

2. The diagnosis system of claim 1, further comprising:
a first member attached to and extending from the first gear; and
a second member attached to and extending from the second gear;
wherein the first target is carried by the first member and the second target is carried by the second member; and
wherein the spatial relationship is a circumferential distance of the first target relative to the second target.

3. The diagnosis system of claim 2, wherein the first target is a surface treatment on a surface of the first member.

4. The diagnosis system of claim 1, further comprising:
a display subsystem in data communication with the processing system, the display subsystem having:
a display adapted to display the spatial relationship of the first target relative to the second target.

5. The diagnosis system of claim 1, wherein the first target is a tooth of the first set of teeth.

6. The diagnosis system of claim 1, wherein the first sensor emits a magnetic field, which in turn is disturbed by the first target; and
wherein the first sensor detects the disturbance of the first target.

7. The diagnosis system of claim 1, wherein the first sensor emits a beam of light, which in turn is disturbed by the first target; and
wherein the first sensor detects the disturbance of the first target.

8. A diagnosis system adapted to determine wear between a male attachment portion of a first member of a spline system, the male portion being adapted to engage with a female attachment portion of a second member of the spline system, the diagnosis system comprising:
a first target positioned on the first member;
a second target positioned on the second member;
a first sensor configured to detect a location of the first target;
a second sensor configured to detect a location of the second target; and
a processing system in data communication with the first sensor and the second sensor, the processing system being configured to process a spatial relationship between the first target relative to the second target;
wherein the male portion fits within the female attachment portion; and
wherein after a time lapse of rotation between the male attachment portion and the female attachment portion, the spatial relationship between the first target and the second target changes, thus indicating wear between the male attachment portion and the female attachment portion.

9. The diagnosis system of claim 8, wherein the male attachment portion has a set of teeth adapted to intermesh with a set of teeth of the female attachment portion.

10. The diagnosis system of claim 8, wherein the male attachment portion has a key adapted to fit within a key slot of the female attachment portion.

11. The diagnosis system of claim 8, further comprising:
a first member attached to and extending from the male attachment portion; and
a second member attached to and extending from the female attachment portion;
wherein the first target is carried by the first member and the second target is carried by the second member; and
wherein the spatial relationship is a circumferential distance of the first target relative to the second target.

12. The diagnosis system of claim 11, wherein the first target is a surface treatment on a surface of first member.

13. The diagnosis system of claim 8, further comprising:
a display subsystem in data communication with the processing system, the display subsystem having:
a display adapted to display the spatial relationship of the first target relative to the second target.

14. The diagnosis system of claim 8, wherein the first sensor emits a magnetic field, which in turn is disturbed by the first target; and
wherein the first sensor detects the disturbance of the first target.

15. The diagnosis system of claim 8, wherein the first sensor emits a beam of light, which in turn is disturbed by the first target; and
wherein the first sensor detects the disturbance of the first target.

16. A diagnosis method to determine teeth wear between a first set of teeth of a first gear and a second set of teeth of a second intermeshing gear, the diagnosis method comprising:
intermeshing the first set of teeth with the second set of teeth;
sensing a location of a first target positioned on the first set of teeth with a first sensor;
sensing a location of a second target positioned on the second set of teeth with a second sensor; and
determining the spatial relationship between the location of the first target relative to the location of the second target with a processing system of a computer in data communication with the first sensor and the second sensor;
wherein after a time lapse of rotation between the first set of teeth and the second set of intermeshing teeth, the spatial relationship between the first target and the second target changes, thus indicating wear between the first set of teeth and the second set of teeth.

17. The diagnosis method of claim 16, further comprising:
displaying the spatial relationship of the first target relative to the second target with a display subsystem in data communication with the processing system.

18. The diagnosis method of claim 16, further comprising: emitting a magnetic field with the first sensor; and detecting a disturbance of the magnetic field by the first target with the first sensor.

\* \* \* \* \*